United States Patent
Lee

(10) Patent No.: US 10,794,262 B2
(45) Date of Patent: Oct. 6, 2020

(54) INTEGRATED FLOW RATE CONTROL VALVE ASSEMBLY AND ENGINE COOLING SYSTEM INCLUDING THE SAME

(71) Applicants: HYUNDAI MOTOR COMPANY, Seoul (KR); Kia Motors Corporation, Seoul (KR)

(72) Inventor: Hyo-Jo Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/435,962

(22) Filed: Jun. 10, 2019

(65) Prior Publication Data

US 2020/0263595 A1 Aug. 20, 2020

(30) Foreign Application Priority Data

Feb. 20, 2019 (KR) ........................ 10-2019-0019818

(51) Int. Cl.
| | |
|---|---|
| *F01P 7/14* | (2006.01) |
| *F16K 11/08* | (2006.01) |
| *F16K 11/085* | (2006.01) |
| *F16K 31/04* | (2006.01) |

(52) U.S. Cl.
CPC .............. *F01P 7/14* (2013.01); *F16K 11/085* (2013.01); *F01P 2007/146* (2013.01); *F16K 31/041* (2013.01)

(58) Field of Classification Search
CPC ..... F01P 2007/146; F01P 7/14; F16K 31/041; F16K 31/535; F16K 5/0464
See application file for complete search history.

(56) References Cited

U.S. PATENT DOCUMENTS

| | | | | |
|---|---|---|---|---|
| 4,517,938 A | * | 5/1985 | Kruger | F01L 7/021 |
| | | | | 123/190.17 |
| 9,988,966 B2 | * | 6/2018 | Lee | F01P 7/165 |
| 2005/0034688 A1 | * | 2/2005 | Lelkes | F16K 11/074 |
| | | | | 123/41.01 |
| 2005/0268974 A1 | * | 12/2005 | Enzinna | F16K 11/07 |
| | | | | 137/625.5 |
| 2015/0101693 A1 | * | 4/2015 | Enomoto | F16K 27/003 |
| | | | | 137/597 |
| 2017/0074154 A1 | * | 3/2017 | Kaneko | F01P 11/18 |
| 2017/0335749 A1 | * | 11/2017 | Maruyama | F16K 11/0873 |
| 2017/0370272 A1 | * | 12/2017 | Koguchi | F01P 7/16 |
| 2018/0347445 A1 | * | 12/2018 | Kaneko | F01P 3/20 |
| 2018/0371982 A1 | * | 12/2018 | Bilancia | F02F 1/40 |

FOREIGN PATENT DOCUMENTS

KR 10-1896376 B1 9/2018

* cited by examiner

*Primary Examiner* — Long T Tran
(74) *Attorney, Agent, or Firm* — Morgan, Lewis & Bockius LLP

(57) ABSTRACT

An integrated flow rate control valve assembly is provided between an engine and a radiator. The integrated flow rate control valve assembly includes a housing in which a plurality of valve rooms separated by partition walls are formed and a plurality of rotary valves provided in the plurality of valve rooms, respectively, and an engine cooling system including the same, and according to the present disclosure, a sealing between cooling water lines is fundamentally solved, thereby enabling cooling water leakage prevention and structural robustness.

10 Claims, 7 Drawing Sheets

INTEGRATED FLOW RATE CONTROL VALVE ASSEMBLY AND ENGINE COOLING SYSTEM INCLUDING THE SAME

CROSS-REFERENCE(S) TO RELATED APPLICATIONS

This application claims priority to Korean Patent Application No. 10-2019-0019818, filed on Feb. 20, 2019, which is incorporated herein by reference in its entirety.

BACKGROUND OF THE DISCLOSURE

Field of the Disclosure

The present disclosure relates to an integrated flow rate control valve assembly, and an engine cooling system including the same.

Description of Related Art

Vehicles have a cooling system for cooling the vehicle engine. The cooling system is configured to circulate cooling water between a radiator and the engine to radiate heat from the engine (a head, a block) to the radiator. In the cooling system, cooling water or coolant water discharged from the engine flows into the radiator through an integrated flow rate control valve that is provided for controlling a flow rate of cooling water flowing into the radiator, an oil cooler, a heater, an exhaust gas recirculation (EGR) cooler, and the like.

The contents described in Description of Related Art are to help the understanding of the background of the present disclosure, and may include what is not previously known to those skilled in the art to which the present disclosure pertains. Applicant does not admit that any information contained in this section constitutes prior art.

SUMMARY OF THE DISCLOSURE

The present disclosure relates to an integrated flow rate control valve assembly configured to adjust the discharge amount and a discharge direction of cooling water passing through a vehicle engine. One aspect provides an integrated flow rate control valve assembly that is applied to an engine cooling system to provide a sealing between cooling water lines, thereby enabling cooling water leakage prevention and structural robustness, and an engine cooling system including the same.

An integrated flow rate control valve assembly according to one aspect of the present disclosure may be provided between an engine and a radiator and may include a housing in which a plurality of valve rooms separated by partition walls are formed and a plurality of rotary valves provided in the plurality of valve rooms, respectively.

In addition, the housing may have a plurality of cooling water inlet ports and a plurality of cooling water outlet ports formed therein. In embodiments, the plurality of cooling water outlet ports may be formed in the plurality of valve rooms, respectively.

Furthermore, the plurality of valve rooms may be separated from each other.

More specifically, three independent valve rooms may be formed in the housing.

Accordingly, among the plurality of valve rooms, a first valve room may have a first cooling water inlet port formed in one side thereof and a first cooling water outlet port formed in the other side thereof, a second valve room may have a second cooling water inlet port formed in one side thereof and a second cooling water outlet port formed in the other side thereof, and a third valve room may have a third cooling water inlet port formed in one side thereof and a third cooling water outlet port formed in the other side thereof.

Here, the first cooling water inlet port may be connected to an engine head side, and the first cooling water outlet port may be connected to the radiator side.

In addition, the second cooling water inlet port may be connected to the engine head side, and the second cooling water outlet port may be connected to an exhaust gas recirculation (EGR) side.

Also, the third cooling water inlet port may be connected to an engine block side, and the third cooling water outlet port may be connected to the radiator side.

Furthermore, the integrated flow rate control valve assembly may further include an actuator coupled to the housing, and a shaft configured to be rotated by the actuator and coupled to the plurality of rotary valves.

In addition, an engine cooling system of the present disclosure may include the above mentioned integrated flow rate control valve assembly

DESCRIPTION OF EMBODIMENTS

Hereinafter, embodiments of the present disclosure will be described with reference to the accompanying drawings.

In order to fully understand the present disclosure, operational advantages of the present disclosure and objects achieved by implementing the present disclosure, reference should be made to the accompanying drawings illustrating embodiments of the present disclosure and the description on the accompanying drawings.

In describing embodiments of the present disclosure, a description of well-known technologies or a repetitive description which may unnecessarily obscure the gist of the present disclosure will be abbreviated or omitted.

Figure 1:
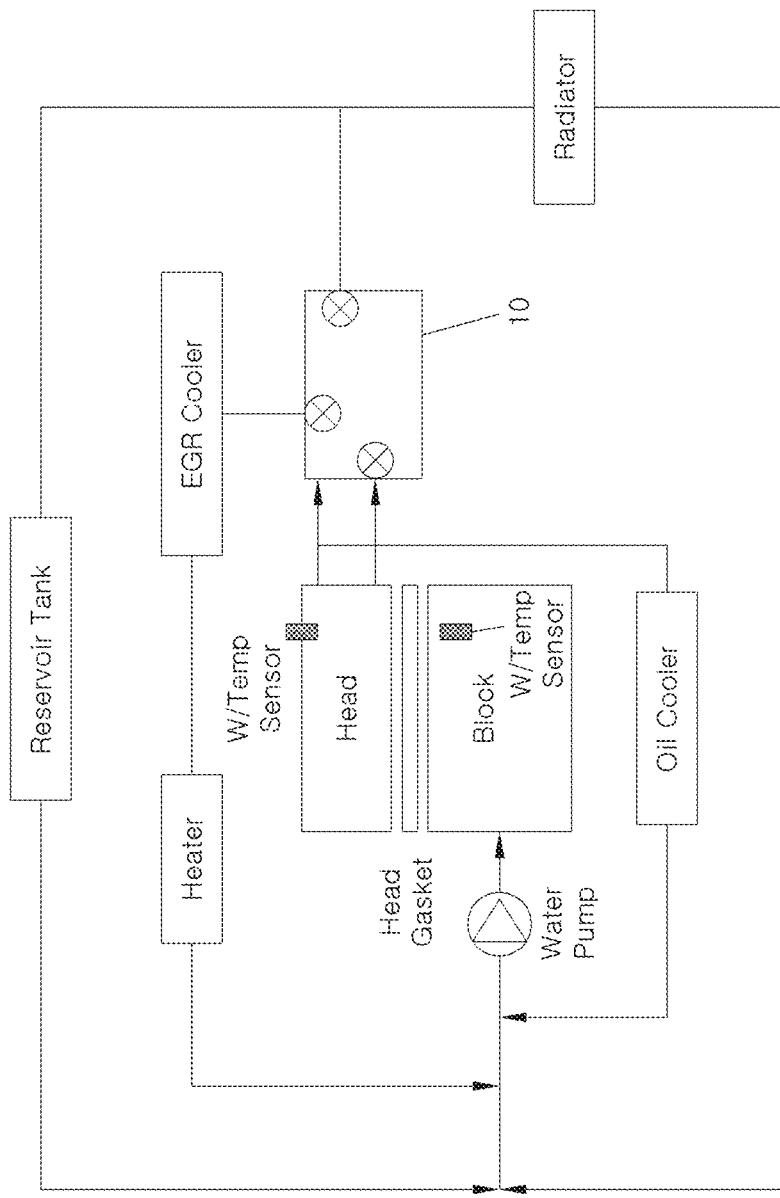
FIG. 1 is a view schematically illustrating an example of an engine cooling system.

FIG. 1 is a view illustrating an example of a cooling system of a vehicle engine, and the cooling system is provided for cooling the vehicle engine and configured to circulate cooling water between a radiator and the engine to radiate heat from the engine (a head, a block) to the radiator.

In addition, cooling water discharged from the engine flows into the radiator through an integrated flow rate control valve 10, and the integrated flow rate control valve 10 may be mounted on a cooling water outlet port or inlet port of the engine to control a flow rate of cooling water flowing into the radiator, an oil cooler, a heater, an exhaust gas recirculation (EGR) cooler, and the like.

The integrated flow rate control valves may be classified into a rotary type valve and a cam lift type valve (poppet type valve).

In the cam lift type, the integrated flow rate control valve is vertically moved by rotation of a cam to control the flow rate. This cam lift type of integrated flow rate control valves may have good controllability, but may have risks of valve wear, tilting and leakage due to repetitive operation.

In the rotary type, the integrated flow rate control valve has a configuration in which a flow rate is controlled by rotation of a rotary valve driven by operation of a motor. This rotary type of integrated flow rate control valves may have advantages of a simple structure and of controlling the flow rate by varying a shape of a cooling water channel in the rotary valve, but may have controllability lower than the cam lift type and risks of cooling water leakage.

In the engine cooling system shown in FIG. 1, in order to maximize fuel efficiency and performance improvement of an engine, the flow rate of cooling water is controlled or regulated in various places. Accordingly, when the rotary type integrated flow rate control valve is applied, there are disadvantages that a sealing structure for leakage at each connection port is complicated and it is difficult to seal at the connection ports. As a result, there are risks of cooling water leakage, and occurrence of cooling water leakage may deteriorate fuel efficiency and performance of the engine.

Figure 2:
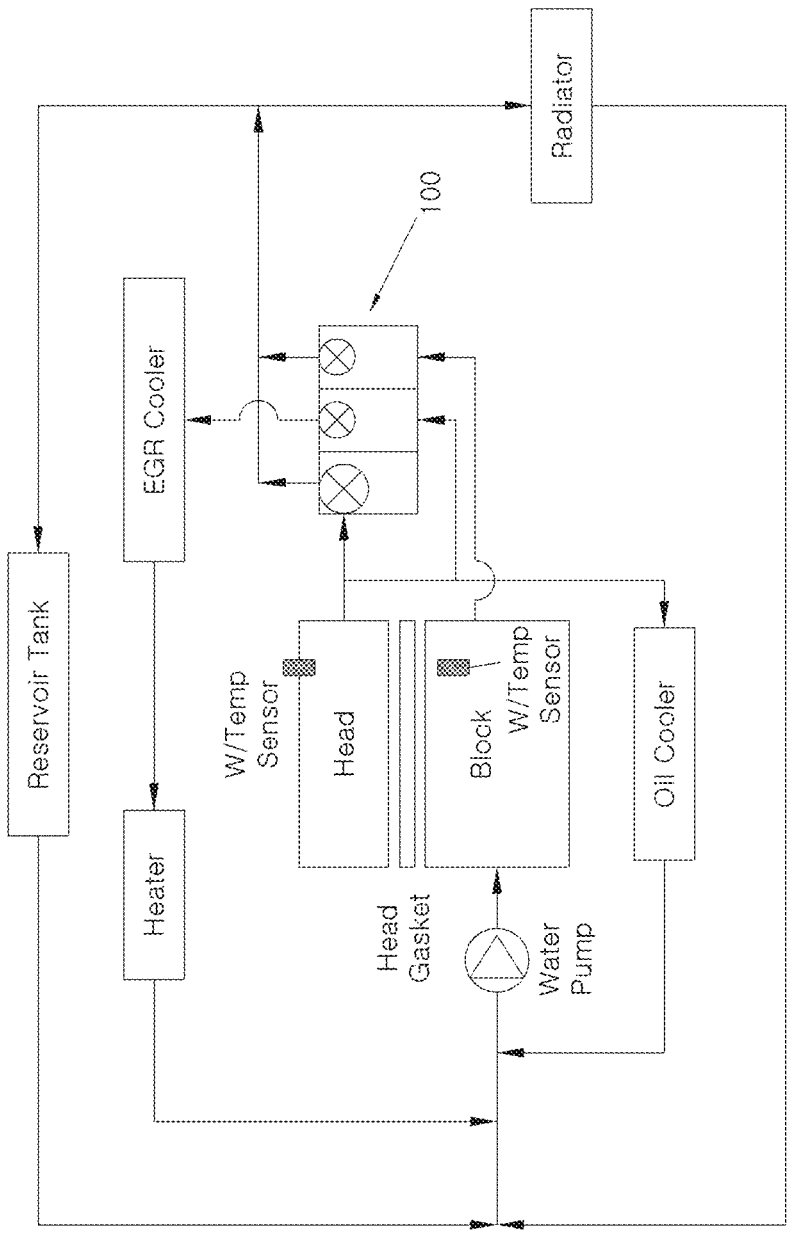
FIG. 2 is a view schematically illustrating an engine cooling system according to the present disclosure.
Figure 3:
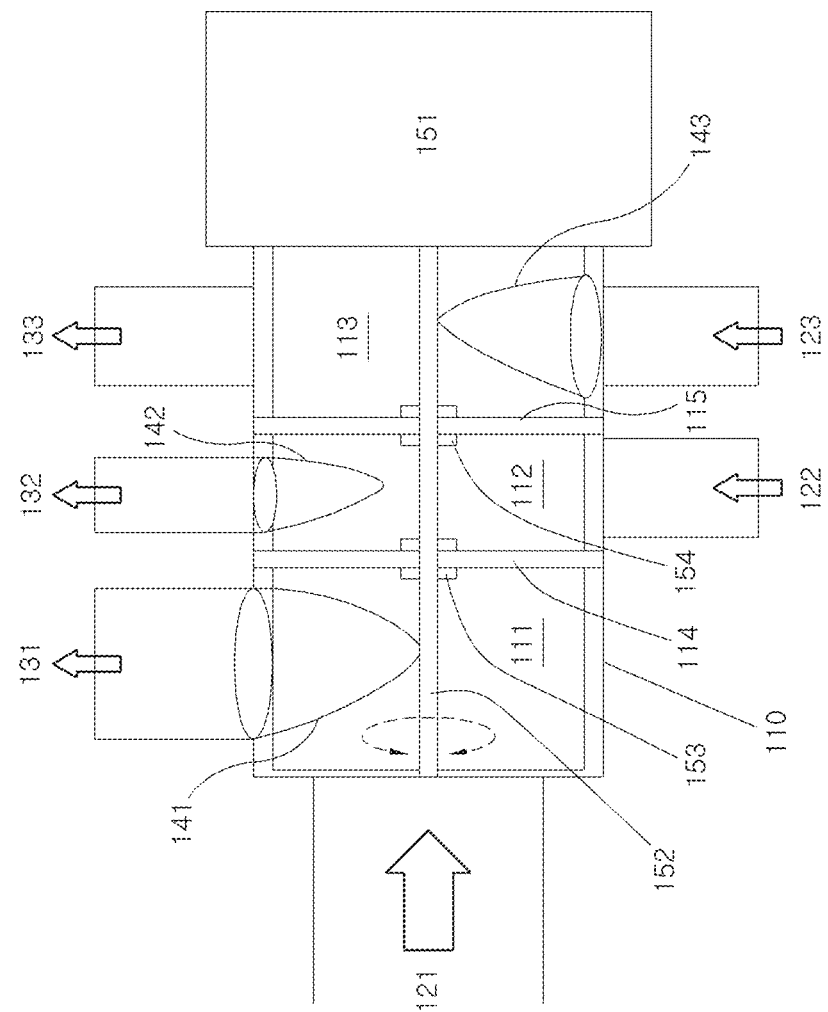
FIG. 3 is a view schematically illustrating an integrated flow rate control valve assembly according to the present disclosure.

FIG. 2 is a view schematically illustrating an engine cooling system according to embodiments discussed in the present disclosure, and FIG. 3 is a view schematically illustrating an integrated flow rate control valve assembly according to the present disclosure.

Hereinafter, an integrated flow rate control valve assembly according to one embodiment of the present disclosure and an engine cooling system including the same are described with reference to FIGS. 2 and 3.

An integrated flow rate control valve assembly 100 according to the present disclosure is provided between an engine (an engine head, an engine block) and a radiator of an engine cooling system as shown in FIG. 2 and is configured to control a supply and a flow rate of cooling water to three cooling water channels of a heater and an exhaust gas recirculation (EGR) cooler side, a radiator side and engine block side, and to enable the engine head and the engine block to be separately cooled without additional flow rate control valve.

To this end, the integrated flow rate control valve assembly 100 according to the present disclosure is basically composed of a rotary valve type as shown in FIG. 3.

Three rotary valves 141, 142 and 143 configured to control the three cooling water channels are provided in a housing 110, and a first partition wall 114 and a second partition wall 115 are formed in the housing 110 to partition an internal space of the housing into three independent valves rooms 111, 112 and 113.

Accordingly, a first cooling water inlet port 121 connected to the engine head side is formed in one side of the first valve room 111, a first cooling water outlet port 131 connected to the radiator side is formed in the other side of the first valve room, and the first rotary valve 141 configured to control circulation of cooling water from the first cooling water inlet port 121 to the first cooling water outlet port 131 is provided in the first valve room 111.

In addition, a second cooling water inlet port 122 connected to the engine head side is formed in one side of the second valve room 112, a second cooling water outlet port 132 connected to the EGR cooler side is formed in the other side of the second valve room, and the second rotary valve 142 configured to control circulation of cooling water from the second cooling water inlet port 122 to the second cooling water outlet port 132 is provided in the second valve room 112.

Furthermore, a third cooling water inlet port 123 connected to the engine block side is formed in one side of the third valve room 113, a third cooling water outlet port 133 connected to the radiator side is formed in the other side of the third valve room, and the third rotary valve 143 configured to control circulation of cooling water from the third cooling water inlet port 123 to the third cooling water outlet port 133 is provided in the third valve room 113.

In the configuration shown in FIG. 1, for example, if a sealing provided in each cooling water channel is not perfect, cooling water may be leaked to adjacent cooling water, and so reliability of the flow rate control may be lowered.

On the contrary, in the configuration of the separable type flow rate control valve assembly of the present disclosure, the partition wall is provided for each port to fundamentally solve the sealing of the port.

The first rotary valve 141, the second rotary valve 142 and the third rotary valve 143 are operated and controlled by an actuator 151 coupled to the housing 110. To this end, a shaft 152 coupled to and rotated by the actuator 151 are coupled to the first rotary valve 141, the second rotary valve 142 and the third rotary valve 143.

To this end, the shaft 152 passes through the first partition wall 114 and the second partition wall 115 and are coupled with the first rotary valve 141, the second rotary valve 142 and the third rotary valve 143 in the first valve room 111, the second valve room 112 and the third valve room 113, respectively.

In addition, for rotation of the shaft 152, a first bearing 153 is provided around a through hole of the first partition wall 114 through which the shaft passes and a second bearing 154 is provided around a through hole of the second partition wall 115 through which the shaft passes.

Meanwhile, since the partition wall is provided for every port, the separable type flow rate control valve assembly of the present disclosure may be modularized to enable each port to be separated.

For example, since the valve rooms can be separated from and coupled with each other with respect to the partition wall, the valve rooms and the ports may be combined in different sizes thereof depending on engine size, engine flow rate control strategy, or the like.

For example, in the case where the cooling water flow rate is controlled by means of two ports in a state where the valve rooms are equipped with the port LP of large capacity, the port MP of medium capacity, and the port SP of small capacity, respectively, the following combinations are possible.

1) Heavy duty engine: LP+LP, LP+MP, LP+SP
2) Medium engine: LP+MP, LP+SP, MP+MP, MP+SP
3) Small engine: MP+SP, SP+SP In addition, in the case where the flow rate of cooling water is controlled by using three ports, the following combinations are possible.

1) Heavy duty engine: LP+LP+LP, LP+LP+MP, LP+MP+MP, LP+MP+SP, LP+SP+SP

2) Medium engine: LP+MP+MP, LP+MP+SP, LP+SP+SP, MP+MP+MP, MP++MP+SP, MP+SP+SP

3) Small engine: MP+MP+SP, MP+SP+SP, SP+SP+SP

Figure 4:
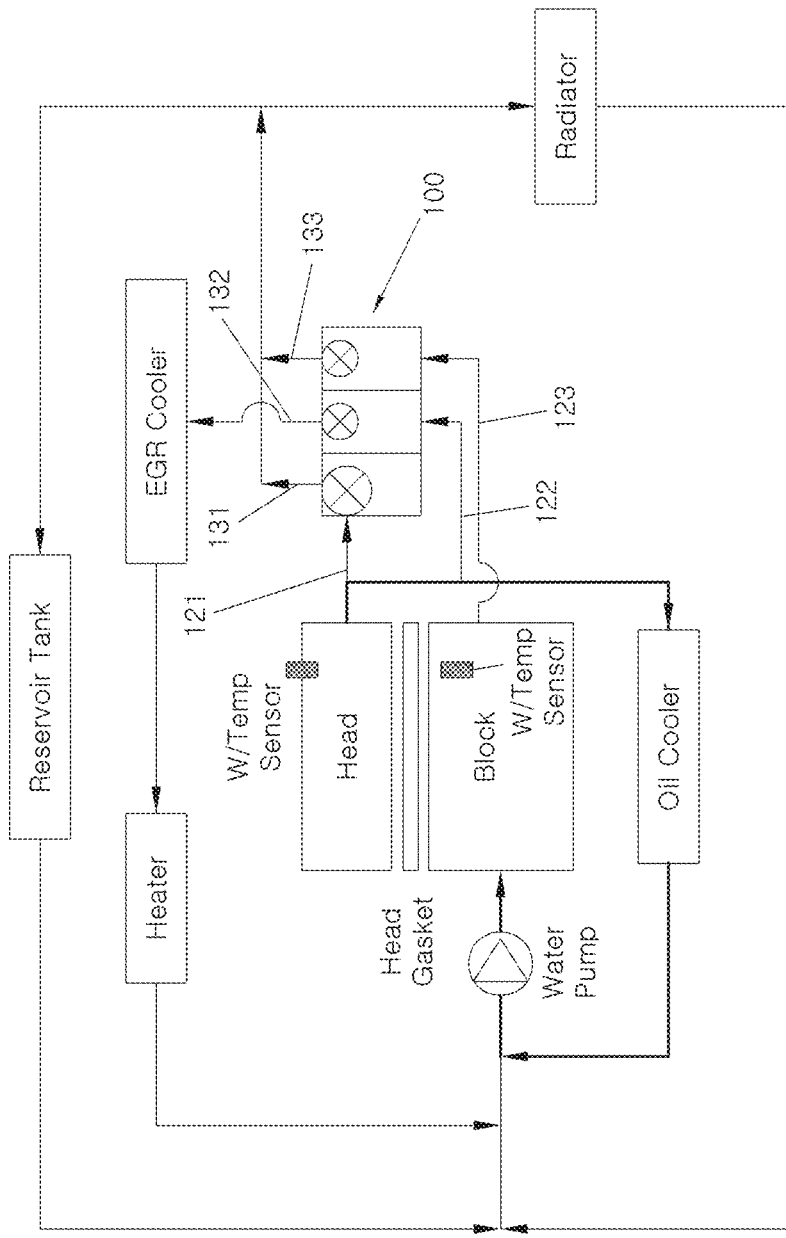
FIG. 4 is a view illustrating cooling water flow caused by the integrated flow rate control valve assembly under cold condition.

As illustrated in FIGS. 4 to 7, the valve assembly having the configuration discussed above can control the three cooling water channels of the cooling system and can separately cool the engine head and the engine block, thereby contributing to improvement of fuel efficiency and performance. In FIGS. 4-7, the cooling water flows through the coolant channels illustrated with thicker lines, and the cooling water does not the coolant channels First of all, FIG. 4 is a view illustrating cooling water flow caused by the integrated flow rate control valve assembly under cold condition.

In a cold state (a temperature of about 50° C. or less), all of the first rotary valve 141, the second rotary valve 142 and the third rotary valve 143 are closed to rapidly increase a temperature of cooling water temperature, thereby accelerating warming-up. An oil cooler allows cooling water to flow, thereby increasing a temperature of oil.

Figure 5:
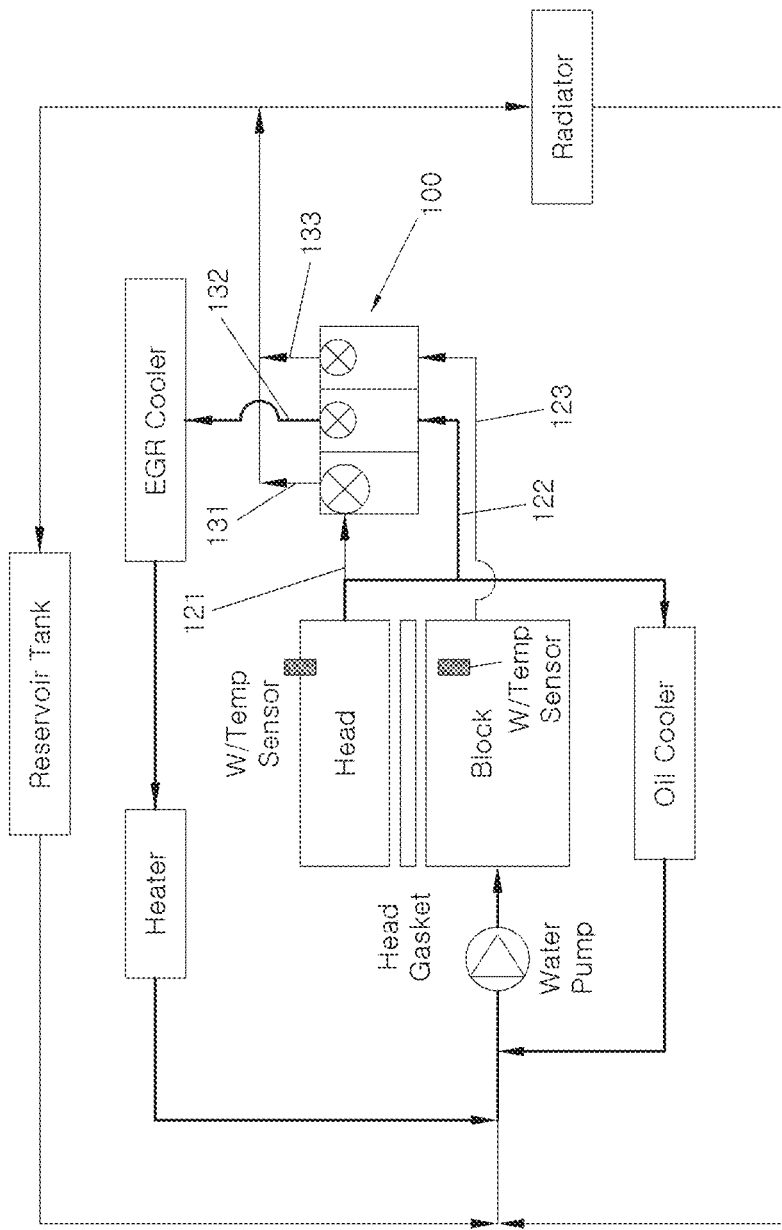
FIG. 5 is a view illustrating cooling water flow caused by the integrated flow rate control valve assembly under warm condition.

FIG. 5 is a view illustrating cooling water flow caused by the integrated flow rate control valve assembly under warm condition. When a temperature of cooling water in the cold state is gradually increased to become a warm state, the second rotary valve 142 is opened to flow cooling water into the heater and the EGR cooler and to increase a temperature of the heater and the EGR cooler, and so heating performance, fuel efficiency and performance are enhanced.

Figure 6:
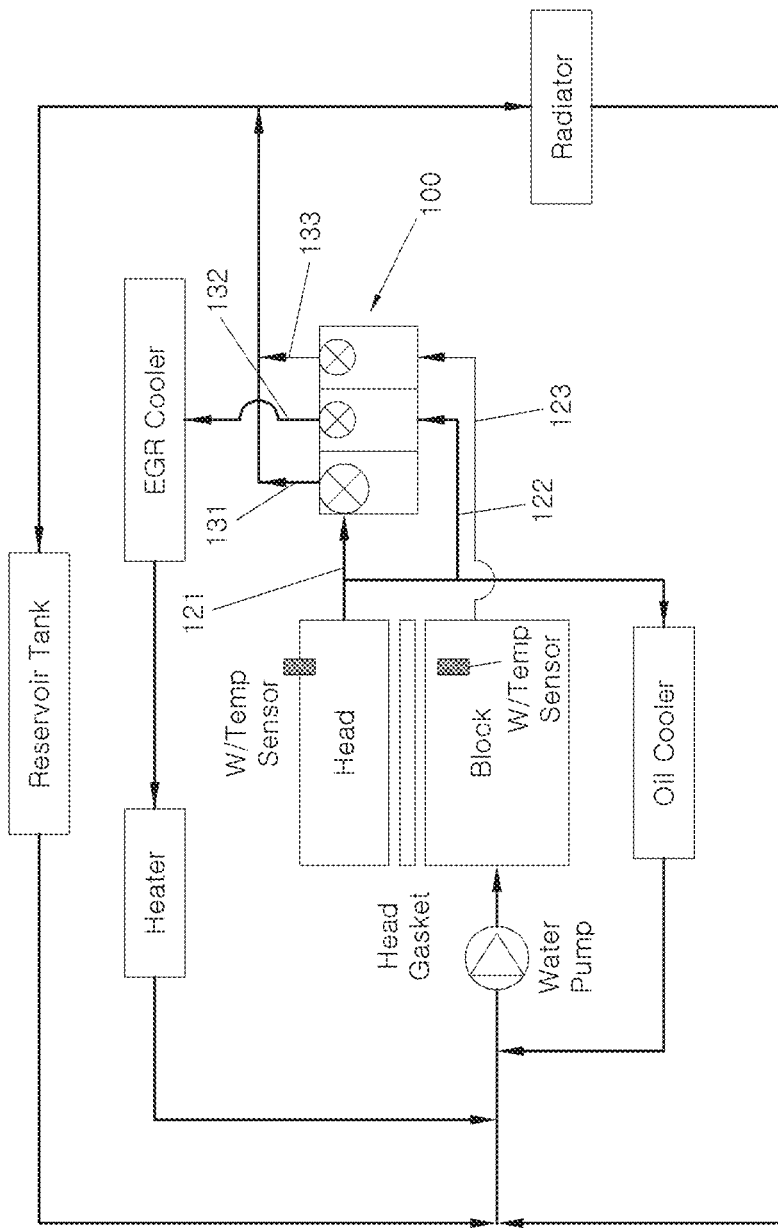
FIG. 6 is a view illustrating cooling water flow caused by the integrated flow rate control valve assembly under high-temperature condition.

Next, FIG. 6 is a view illustrating cooling water flow caused by the integrated flow rate control valve assembly under high-temperature condition. In a high-temperature state, the first rotary valve 141 is controlled to open the first cooling water outlet port 131 and to flow cooling water into the radiator, thereby lowering a temperature of cooling water. By reducing friction due to an increase in temperature of overall cooling water, it is possible to improve fuel efficiency and performance.

Figure 7:
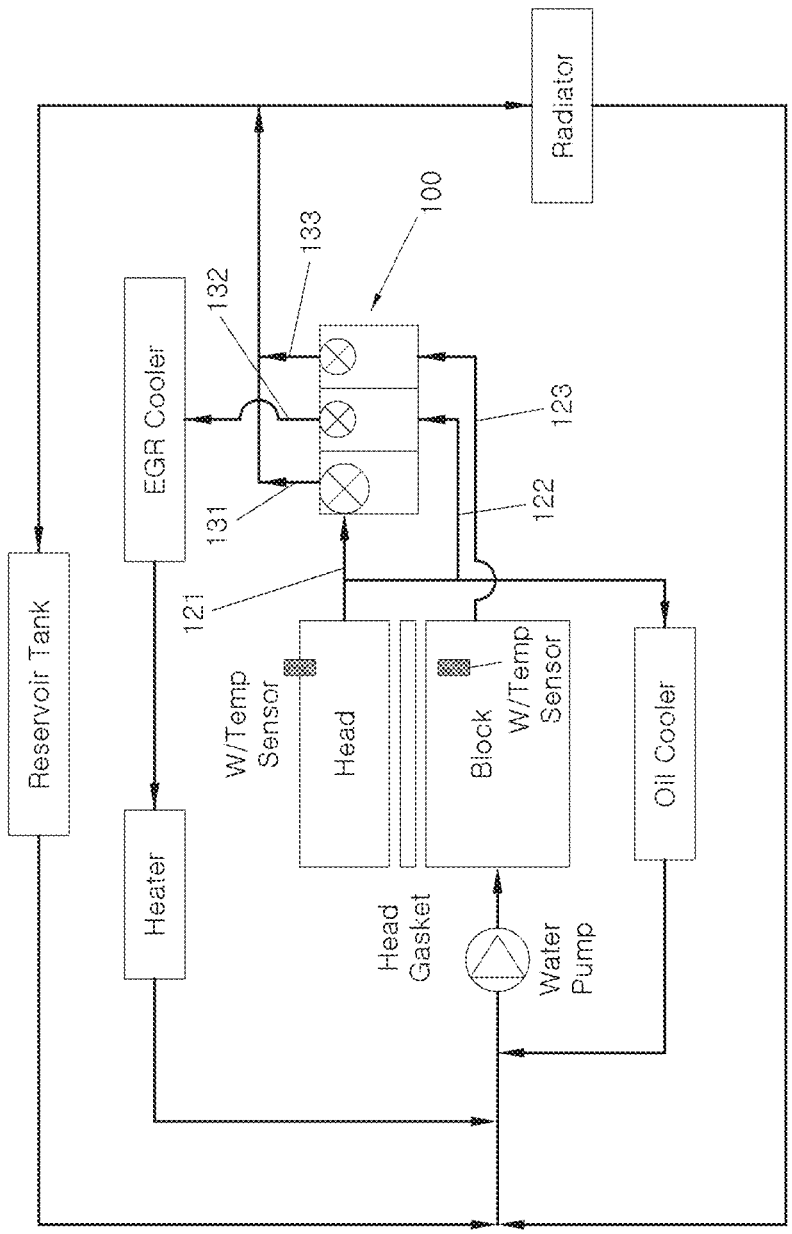
FIG. 7 is a view illustrating cooling water flow caused by the integrated flow rate control valve assembly under hot condition.

Finally, FIG. 7 is a view illustrating cooling water flow caused by the integrated flow rate control valve assembly under hot condition. When a temperature of cooling water in the engine block is increased to 105° C., the third rotary valve 143 is controlled to open the third cooling water outlet port 133 as well and maximize a flow rate of cooling water, and so that there is no problem in cooling the engine.

According to the integrated flow rate control valve assembly according to embodiments of the present invention and the engine cooling system including the same, since the rotary valves, which control the cooling water channels, respectively, are provided in separated spaces, respectively, it is possible to fundamentally solve the risk of sealing between the connecting ports.

Further, the integrated flow rate control valve assembly can be made robust without leakage by a simple structure, thereby improving efficiency and reducing a manufacturing cost.

In addition, since the ports are configured to enable each port to be separated, modularity of port is possible.

By separately cooling the engine head and the valve, it is possible to enhance performance and fuel efficiency.

Although the present disclosure has been described with reference to the illustrated drawings, the present disclosure is not limited to the disclosed embodiments, and it will be apparent to those skilled in the art that various modifications and variations can be made without departing from the spirit or scope of the present disclosure. Accordingly, such modifications or changes should be regarded as falling within the scope of the appended claims of the present disclosure, and the scope of the present disclosure should be construed on the basis of the appended claims.

What is claimed is:

1. An integrated flow rate control valve assembly connected to an engine of a vehicle, comprising;
    a housing;
    a plurality of valve rooms formed in the housing and separated by partition walls; and
    a plurality of rotary valves, each of which is provided in a corresponding one of the plurality of valve rooms,
    wherein each of the plurality of valve rooms is not in fluid communication with the other valve rooms.

2. The integrated flow rate control valve assembly of claim 1,
    wherein the housing has a plurality of cooling water inlet ports and a plurality of cooling water outlet ports, and the plurality of cooling water outlet ports are formed in the plurality of valve rooms, respectively.

3. The integrated flow rate control valve assembly of claim 2, further comprising;
    an actuator coupled to the housing; and
    a shaft connected to the actuator and coupled to the plurality of rotary valves,
    wherein the actuator is configured to rotate the shaft to operate the plurality of rotary valves.

4. The integrated flow rate control valve assembly of claim 2, wherein the plurality of valve rooms comprises a first valve room, a second valve room, and a third valve room disposed between the first and second valve rooms.

5. The integrated flow rate control valve assembly of claim 4, wherein the plurality of cooling water inlet ports comprises a first cooling water inlet portion in fluid communication with the first valve room, a second cooling water inlet portion in fluid communication with the second valve room, and a third cooling water inlet portion in fluid communication with the third valve room,
    wherein the plurality of cooling water outlet ports comprises a first cooling water outlet portion in fluid communication with the first valve room, a second cooling water outlet portion in fluid communication with the second valve room, and a third cooling water outlet portion in fluid communication with the third valve room.

6. An engine system comprising:
    an engine;
    an engine cooling system comprising a radiator, an exhaust gas recirculation (EGR) cooler, and the integrated flow rate control valve assembly of claim 5, wherein the integrated flow rate control valve assembly is connected to and in fluid communication with the engine, the radiator and the EGR cooler.

7. The integrated flow rate control valve assembly of claim 6, wherein the first cooling water inlet port is connected to an engine head of the engine, and the first cooling water outlet port is connected to the radiator.

8. The integrated flow rate control valve assembly of claim 6, wherein the second cooling water inlet port is connected to an engine head of the engine, and the second cooling water outlet port is connected to the EGR cooler.

9. The integrated flow rate control valve assembly of claim 6, wherein the third cooling water inlet port is connected to an engine block of the engine, and the third cooling water outlet port is connected to the radiator.

10. The integrated flow rate control valve assembly of claim 6, wherein the first cooling water inlet port is connected to an engine head of the engine, and the first cooling water outlet port is connected to the radiator, wherein the second cooling water inlet port is connected to the engine head of the engine, and the second cooling water outlet port is connected to the EGR cooler, wherein the third cooling water inlet port is connected to an engine block of the engine, and the third cooling water outlet port is connected to the radiator.

* * * * *